US011651452B2

(12) United States Patent
Miller et al.

(10) Patent No.: US 11,651,452 B2
(45) Date of Patent: May 16, 2023

(54) PEST AND AGRONOMIC CONDITION PREDICTION AND ALERTS ENGINE

(71) Applicant: Nutrien AG Solutions, Inc., Loveland, CO (US)

(72) Inventors: Paul S. Miller, Champaign, IL (US); Brent Trenhaile, Champaign, IL (US)

(73) Assignee: NUTRIEN AG SOLUTIONS, INC., Loveland, CO (US)

( * ) Notice: Subject to any disclaimer, the term of this patent is extended or adjusted under 35 U.S.C. 154(b) by 0 days.

(21) Appl. No.: 16/991,247

(22) Filed: Aug. 12, 2020

(65) Prior Publication Data
US 2022/0051350 A1    Feb. 17, 2022

(51) Int. Cl.
| | |
|---|---|
| G06Q 50/02 | (2012.01) |
| G06Q 10/06 | (2012.01) |
| G06Q 10/0635 | (2023.01) |
| G06N 5/045 | (2023.01) |
| A01B 79/00 | (2006.01) |
| G06F 16/9035 | (2019.01) |
| A01C 21/00 | (2006.01) |

(52) U.S. Cl.
CPC .......... *G06Q 50/02* (2013.01); *A01B 79/005* (2013.01); *A01C 21/005* (2013.01); *G06F 16/9035* (2019.01); *G06N 5/045* (2013.01); *G06Q 10/0635* (2013.01)

(58) Field of Classification Search
None
See application file for complete search history.

(56) References Cited

U.S. PATENT DOCUMENTS

| | | | |
|---|---|---|---|
| 5,884,225 | A | 3/1999 | Allen et al. |
| 6,058,351 | A | 5/2000 | McCauley |

(Continued)

FOREIGN PATENT DOCUMENTS

| | | |
|---|---|---|
| WO | 2015/132208 A1 | 9/2015 |
| WO | 2018/162778 A1 | 9/2018 |

OTHER PUBLICATIONS

Insufcient risk assessment of herbicide-tolerant genetically engineered soybeans intended for import into the EU; Miyazaki et al.; 2019 (Year: 2019).*

(Continued)

*Primary Examiner* — Deirdre D Hatcher
(74) *Attorney, Agent, or Firm* — Faegre Drinker Biddle & Reath LLP

(57) ABSTRACT

At least some aspects of the present disclosure are directed to systems and methods of an agronomic condition prediction and alerts engine. In some cases, the engine receives a set of field data and the set of field data includes one or more of geospatial data, crop data, user data, agronomic data, and weather data. In some cases, the engine retrieves a set of agronomic profile data from an agronomic data repository, where each of the set of agronomic profile data representing an agronomic condition and comprising one or more of geospatial profile, crop profile, pest profile, agronomic profile, user data profile, and weather profile corresponding to the agronomic condition. In some embodiments, the engine applies a multivariable processing to the set of field data using the set of agronomic profile data and generates an agronomic condition indicator indicative of one or more agronomic conditions.

23 Claims, 16 Drawing Sheets

(56) References Cited

U.S. PATENT DOCUMENTS

| | | |
|---|---|---|
| 8,862,630 B2 | 10/2014 | Hunter et al. |
| 9,201,991 B1 | 12/2015 | Mewes et al. |
| 9,563,852 B1* | 2/2017 | Wiles ............... G06Q 10/04 |
| 9,880,140 B2 | 1/2018 | Osborne et al. |
| 10,255,391 B2 | 4/2019 | Mewes et al. |
| 2011/0035246 A1 | 2/2011 | Fithian et al. |
| 2013/0036082 A1* | 2/2013 | Natarajan ............ G06Q 30/00 |
| | | 706/50 |
| 2014/0278731 A1 | 9/2014 | Griffin et al. |
| 2015/0310721 A1 | 10/2015 | Johnson |
| 2016/0247076 A1 | 8/2016 | Mewes et al. |
| 2016/0247082 A1 | 8/2016 | Stehling et al. |
| 2017/0188521 A1 | 7/2017 | Jagyasi et al. |
| 2017/0270616 A1 | 9/2017 | Basso |
| 2018/0018414 A1 | 1/2018 | Biswas et al. |
| 2018/0020622 A1 | 1/2018 | Richt |
| 2018/0156767 A1 | 6/2018 | Osborne et al. |
| 2018/0330435 A1 | 11/2018 | Garg |
| 2018/0342020 A1 | 11/2018 | Sen et al. |
| 2019/0050948 A1 | 2/2019 | Perry et al. |
| 2019/0139158 A1 | 5/2019 | Reich et al. |
| 2019/0156255 A1 | 5/2019 | Carroll |
| 2019/0156437 A1 | 5/2019 | Dail et al. |
| 2019/0228477 A1 | 7/2019 | Carter et al. |
| 2019/0266015 A1 | 8/2019 | Chandra et al. |
| 2020/0126232 A1* | 4/2020 | Guo ..................... G06T 5/50 |
| 2020/0309994 A1* | 10/2020 | Eckel ................. G01W 1/10 |
| 2021/0125290 A1* | 4/2021 | Mota Manhaes ...... G06Q 30/06 |
| 2021/0233658 A1* | 7/2021 | Van Assel ............ G16H 10/60 |

OTHER PUBLICATIONS

International Search Report and Written Opinion for international patent application No. PCT/US2021/45493, filed Aug. 11, 2021, dated Nov. 4, 2021.

* cited by examiner

| Pest Name | Spatial Profile | Crop Profile | User Data Sufficient | Agronomic Profile | Weather Profile | Predictive Model Profile | Risk Level | Seed Susceptibility Condition | Assembled Alert |
|---|---|---|---|---|---|---|---|---|---|
| stripe rust | 0 | None | None | None | None | None | 0 | None | You are not at risk for this pest. |
| stripe rust | 1 | 0 | None | None | None | None | 0 | None | You are not at risk for this pest. |
| stripe rust | 1 | 1 | 0 | None | None | None | None | None | Please complete the Field Story planting event: Add planting date and specific seed hybrid. |
| stripe rust | 1 | 1 | 1 | 0 | None | None | 0 | None | {pest_name} may be active in your area but yield impact is unlikely at this growth stage. |
| stripe rust | 1 | 1 | 1 | 1 | 1 | None | 0 | None | You are not at risk for this pest. Weather conditions are not prime for pest development. |
| stripe rust | 1 | 1 | 1 | 1 | 1 | 1 | 0 | 0,1,2,3,4,5,6,7,8,9 | Weather conditions are slightly favorable for {pest_name} development over the next few days. Your seed variety is susceptible to this pest. |
| stripe rust | 1 | 1 | 1 | 1 | 1 | 1 | 1 | 0,1,2,3 | Weather conditions are slightly favorable for {pest_name} development over the next few days. Your seed variety is susceptible to this pest. |
| stripe rust | 1 | 1 | 1 | 1 | 1 | 1 | 1 | 4,5,6 | Weather conditions are slightly favorable for {pest_name} development over the next few days. Your seed variety has moderate susceptibility to this pest. |
| stripe rust | 1 | 1 | 1 | 1 | 1 | 1 | 1 | 7,8,9 | Weather conditions are slightly favorable for {pest_name} development over the next few days. Your seed variety has low susceptibility to this pest. |

To FIG. 3A-2

FIG. 3A-1

| | | | | | | |
|---|---|---|---|---|---|---|
| stripe rust | 1 | 1 | 1 | 1 | 1 | 0,1,2,3 | Weather conditions are moderately favorable for {pest_name} development over the next few days. Your seed variety is susceptible to this pest. |
| stripe rust | 1 | 1 | 1 | 1 | 2 | 4,5,6 | Weather conditions are moderately favorable for {pest_name} development over the next few days. Your seed variety has moderate susceptibility to this pest. |
| stripe rust | 1 | 1 | 1 | 1 | 2 | 7,8,9 | Weather conditions are moderately favorable for {pest_name} development over the next few days. Your seed variety has low susceptibility to this pest. |
| stripe rust | 1 | 1 | 1 | 1 | 3 | 0,1,2,3 | Weather conditions are forecast to be prime for {pest_name} development over the next few days. Your seed variety is susceptible to this pest. |
| stripe rust | 1 | 1 | 1 | 1 | 3 | 4,5,6 | Weather conditions are forecast to be prime for {pest_name} development over the next few days. Your seed variety has moderate susceptibility to this pest |
| stripe rust | 1 | 1 | 1 | 1 | 3 | 7,8,9 | Weather conditions are forecast to be prime for {pest_name} development over the next few days. Your seed variety has low susceptibility to this pest. |

FIG. 3A-2

| Pest Name | Spatial Profile | Spatial condition | Crop Profile | Crop cond. | User data profile | User data cond. | Agronomic profile | Agronomic cond. | Weather profile | Weather cond. | Predictive model profile | Predictive model cond. | Risk level | Seed susceptibility condition | Assembled Alert |
|---|---|---|---|---|---|---|---|---|---|---|---|---|---|---|---|
| Western corn rootworm larvae | 0 | -9999 | None | -9999 | None | -9999 | None | -9999 | None | -9999 | None | None | 0 | -9999 | You are not at risk for this pest. |
| Western corn rootworm larvae | 1 | -9999 | 0 | -9999 | None | -9999 | None | -9999 | None | -9999 | None | None | 0 | -9999 | You are not at risk for this pest. |
| Western corn rootworm larvae | 1 | -9999 | 1 | -9999 | 0 | -9999 | None | -9999 | None | -9999 | None | None | None | -9999 | Please complete the Field Story planting event: Add planting date and specific seed hybrid. |
| Western corn rootworm larvae | 1 | -9999 | 1 | -9999 | 1 | -9999 | 0 | -9999 | None | -9999 | None | None | 0 | -9999 | You are not at risk for this pest. It is too early or too late in the growth season |
| Western corn rootworm larvae | 1 | -9999 | 1 | -9999 | 1 | -9999 | 1 | -9999 | 1 | -9999 | 1 | 1 | 0 | -9999 | You are not at risk for this pest. Your seed has active genetic traits that should provide effective control. |

PEST AND AGRONOMIC CONDITION PREDICTION AND ALERTS ENGINE

TECHNICAL FIELD

The present disclosure relates to systems and methods for pest and agronomic condition prediction and alert generations.

BACKGROUND

Pest and agronomic risk controls are important for growers. Agricultural extension offices often publish paper reports on disease incidence or climate-based risks due to flooding and variable weather conditions. Macroscale pest extent systems are also available for a few primary diseases of concern to farmers by extension or agronomy departments as part of agronomic research systems.

SUMMARY

At least some embodiments of the present disclosure are directed to a method implemented on a computer system having one or more processors and memories. The method includes the steps of: receiving a set of field data for a location, the set of field data comprising one or more of geospatial data, crop data, user data, agronomic data, and weather data; retrieving a set of agronomic profile data from an agronomic data repository stored in the one or more memories, each of the set of agronomic profile data representing an agronomic condition and comprising one or more of geospatial profile, crop profile, pest profile, agronomic profile, user data profile, and weather profile corresponding to the agronomic condition; applying, by the one or more processors, a multivariable processing to the set of field data, using the set of agronomic profile data; and generating an agronomic condition indicator indicative of one or more agronomic conditions applicable to the location.

At least some embodiments of the present disclosure are directed to a computer-implemented system comprising: one or more memories having an agronomic data repository and instructions stored thereon; and one or more processors configured to execute the instructions to perform operations. The operations include: receiving a set of field data for a location, the set of field data comprising one or more of geospatial data, crop data, user data, agronomic data, and weather data; retrieving a set of agronomic profile data from the agronomic data repository, each of the set of agronomic profile data representing an agronomic condition and comprising one or more of geospatial profile, crop profile, pest profile, agronomic profile, and user data profile, and weather profile corresponding to the agronomic condition; applying a multivariable processing to the set of field data, using the set of agronomic profile data; and generating an agronomic condition indicator indicative of one or more agronomic conditions applicable to the location.

At least some embodiments of the present disclosure are directed a method implemented on a computer system having one or more processors and memories. The method includes the steps of: receiving a set of field data for a location, the set of field data comprising one or more of geospatial data, crop data, user data, agronomic data, and weather data; retrieving a set of pest profile data from an agronomic data repository stored in the one or more memories, each of the set of pest profile data representing data for a pest condition and comprising one or more of geospatial profile, crop profile, agronomic profile, user data profile, and weather profile related to the pest; applying, by the one or more processors, a multivariable processing to the set of field data, using the set of pest profile data; and generating a pest risk indicator indicative of a reported pest condition applicable to the location. In some cases, the applying multivariable processing step includes: applying a plurality of profile filters of a first pest condition to the set of field data one-by-one, each of the plurality of profile filters being a binary filter generating an output of pass or fail; in response to at least one of the plurality of profile filters of the first pest condition generating an output of fail, setting a first risk indicator for the first pest condition to negative; in response to each of the plurality of profile filters of the first pest condition generating an output of pass, setting the first risk indicator for the first pest condition to positive. In some cases, the generating a pest risk indicator step includes: generating the pest risk indicator based on the first risk indicator.

BRIEF DESCRIPTION OF DRAWINGS

The accompanying drawings are incorporated in and constitute a part of this specification and, together with the description, explain the advantages and principles of the invention. In the drawings.

FIGS. 3A and 3B illustrate some example alert outputs;

FIGS. 5A-5D are screen captures of some example user interfaces of a client application.

DETAILED DESCRIPTION

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Conventional pest extent systems do not focus on the localized conditions affecting growers' fields directly nor do they reflect the on-farm management that has occurred on the farm. Often, growers receive these reports too late for pest control or must interpret risks to their operations themselves based on their experience and the experience of crop consultants that function as their advisors. At least some embodiments of the present disclosure are directed to determining ahead of the time if a grower's fields are either at risk from pests or under favorable conditions for certain agronomic operations, for example, planting seed. As used in this disclosure, pests refer to unfavorable conditions of fields or crops including but not limited to, disease, insects, weeds or inclement agronomic or weather circumstances, and the like. In some cases, the systems and methods will further determine what actions to be taken and/or when such actions should be taken.

At least some embodiments of the present disclosure are directed to an alert engine using comprehensive methodologies to calculate future risk levels at the level of individual fields for a wide variety of pests and conditions based on digital representations of the grower's activities, operations, agronomic conditions, agronomic and meteorological forecasts. In some cases, alerts and/or messages can indicate both favorable and non-favorable conditions depending on the specific alert generated from the engine.

Figure 1:
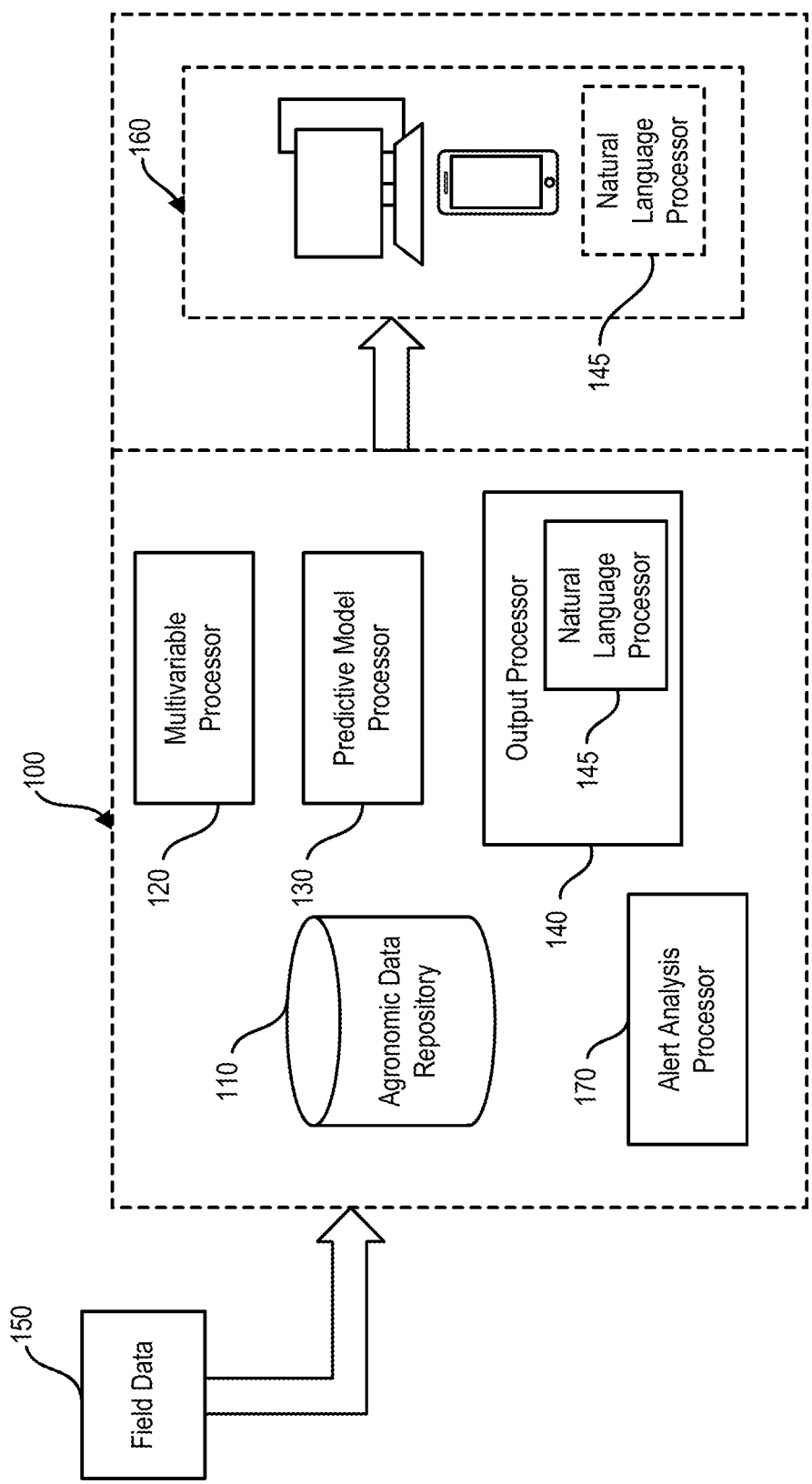
FIG. 1 illustrates a diagram of an example computer-implemented system for the pest and agronomic alert engine.

FIG. 1 illustrates a diagram of an example computer-implemented system for the pest and agronomic alert engine 100. In this example, the system 100 includes an agronomic data repository 110, a multivariable processor 120, a predictive model processor 130, an output processor 140 and an alert analysis processor 170. One or more components of the system 100 are optional. In some cases, the system 100 includes a client application 160. In some embodiments, the system 100 receives field data 150 related to a location. In some cases, a location refers to a specific field. In some cases, a location refers to fields of a grower. In some other cases, a location refers to fields of multiple growers. In yet some other cases, a location refers to fields in a region. In some cases, the system 100 receives the field data 150 via wired or wireless transmission. In some cases, the system 100 receives a part or all of the field data 150 via retrieving the data from a data repository or a data source. In one example, the data source is a public data source (e.g., public meteorological data). In some other cases, the system 100 receives the field data 150 via software programing interfaces and/or web services from another software system (e.g., a grower's operation management system).

The field data 150 includes a number of agronomic related digital field data, including, for example, geospatial data, crop data, user data profile, agronomic data, weather data, and the like. The geospatial data may include the location data of a location, a field and/or a grower, for example. The crop data may include data on current season crops, for example. The user data profile may include collected data and software interface information on the user's digitized management operations. Here, a user can be a grower, a grower representative, a crop consultant, a sales agent, a regional manager, or other users whose system interfaces, directly or indirectly, with the alert engine 100. For example, the user data profile includes what data are collected on the current season crops and what data are collected on the field. The agronomic data includes agronomic conditions for the field(s), for example, the growth stage of a crop or the seed types and trait(s) of crops in the field(s). The weather data may include data on weather variables that come from historic and/or forecast weather data, for example.

In some embodiments, the agronomic data repository 110 includes a set of agronomic profile data. In some cases, the agronomic profile data includes a set of pest profile data. The set of pest profile data includes, for example, for each pest in the repository, weather profile, crop profile, agronomic profile, geospatial profile, predictive model profile, and the like. Weather profile refers to, for example, temperature, humidity, wind, and other weather data, which may or may not trigger the pest risk. Crop profile refers to, for example, certain seeds, seed types, and other crop information, which may or may not be susceptible to the pest risk. Agronomic profile refers to, for example, seed traits (e.g., seed without or without bollworm trait), growth stage, and other agronomic information, which may affect the pest risk. Geospatial profile refers to, for example, state information, region information, and other geospatial information, where the pest have been found. Predictive model profile refers to, for example, a predictive model calculating the risk level and crop susceptibility based on a number of variables, including, for example, the weather condition, the crop information, the agronomic information, geospatial information, and other model data. In some cases, the set of pest profile data includes, for example, for some pests, other information such as importance (e.g., potential impacts), identification (e.g., how to identify the pest), and treatment (e.g., how to control the pest impacts or eliminate the pest).

In some embodiments, the set of agronomic profile data includes a set of crop profile data. The set of crop profile data includes, for example, for each crop in the repository, agronomic information, weather condition, pest information, and the like. In some cases, the pest information of the crop profile data is linked to the corresponding pest profile in the set of pest profile data.

The agronomic data repository 110 may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some embodiments, the multivariable processor 120 processes the field data 150 based on the set of agronomic profile data stored in the agronomic data repository 110. In some embodiments, the multivariable processor 120 uses profile attributes of the agronomic profile data as variables for processing functions. In some cases, the multivariable processor 120 includes one or more profile evaluation filters, or referred to as profile filters. In some cases, the multivariable processor 120 uses a priority order of multiple processing functions and/or profile evaluation filters. As an example, the multivariable processor 120 applies a simple profile evaluation filter (e.g., a binary filter) before a more complex profile evaluation filter (e.g., a matched filter). In some cases, a binary filter is a filter determining a binary output (e.g., 0 or 1, pass or fail) using a predetermined threshold. For example, the filter outputs 1 if the evaluated value is higher than the predetermined threshold and otherwise 0. As another example, the multivariable processor 120 applies multiple profile evaluation filters according to a predetermined order. As yet another example, the multivariable processor 120 applies only some of the multiple profile evaluation filters but not all of them after predetermined criteria are reached. In one example, the multivariable processor 120 applies the multiple profile evaluation filters one-by-one until a negative indicator (e.g., pest risk negative) is reached. In another example, the multivariable processor 120 applies the multiple profile evaluation filters one-by-one until a positive indicator (e.g., crop stage positive) is reached.

In some embodiments, the multivariable processor 120 includes profile filters applying signature scanning algorithms. In some cases, the multivariable processor 120 uses a signature scanning methodology that progressively classifies risk by filtering each pest through multiple layers of known signature, where more complex features are determined in later layers. In some cases, multivariable processor 120 can check, in systematic order, for each farm field to calculate if an alert or a risk might apply and be made available to the grower through a user interface, as described in more details below. In some embodiments, the multivariable processor 120 generates an alert output and/or a condition indicator after processing the field data 150. In some other embodiments, the multivariable processor 120 selects a subset of agronomic profile data retrieved from the agronomic data repository 110.

In some embodiments, the signature scanning methodology is employed to calculate the probability of a crop disease or an agronomic alert. One example of the signature scanning methodology is illustrated in in FIG. 2B. In some embodiments, the signature scanning methodology includes a progress scanning/filtering approach that sequences through filtering of spatial profiles, crop profiles, user data profiles, agronomic profiles, weather profiles, and predictive modelling profiles, and/or the like. These profile filters can all be used or preferentially selected to be applied as part of the signature scanning methodology for that specific disease or alert. In some cases, only some of the profile filters may apply.

The predictive model processor 130 is an optional component of the system 100. In some embodiments, the predictive model processor 130 applies one or more predictive model(s) to the field data 150. In some embodiments, the predictive model processor 130 applies predictive modeling to the field data 150 and the subset of agronomic profile data selected by the multivariable processor 120. In some cases, the predictive model is a temporal model having a variable aggregated over time (e.g., maximum value, average value, average maximum daily value, etc.). In some cases, the predictive model is a statistical model that is generating by statistical analysis, for example, statistical analysis on time-variant historical data. In some cases, the predictive model is a biophysical model generated based on biophysical analysis on attributes of an agronomic condition. In some cases, the predictive model is pest specific, which is stored in the corresponding pest profile data in the agronomic data repository 110.

In some embodiments, the predictive model processor 130 generates an alert output and/or a condition indicator. In some cases, the condition indicator can be a pest risk indicator, for example, providing a risk level of a certain pest. In some other cases, the condition indicator can be a crop stage indicator, for example, providing the information on whether a certain field is suitable for the selected crop. In some cases, the condition indicator is a binary indicator, for example, positive or negative, 0 or 1, or the like. In some implementations, the condition indicator includes data providing, for example, the likelihood of a certain pest.

In one embodiment, a condition indicator (CI) can be determined using equation (1), based on weather data, such as temperature or aggregated temperature (T), humidity or aggregated humidity (H):

$$CI=f1(T,H) \quad (1),$$

where CI is a function of T and H over a period of time. In some cases, the length of the period of time is predetermined (e.g., 7 days). In some cases, the f1 function is determined by statistical analysis of historical data.

In one example, a daily risk level (DRL) is calculated based on weather data, such as temperature or aggregated temperature (T), humidity or aggregated humidity (H), using equation (2):

$$DRL=f2(T,H) \quad (2),$$

where DRL is a function of T and H over that day. Next, the condition indicator (CI) is determined using equation (3):

$$CI=f3(DRL \text{ over time}) \quad (3),$$

where CI is function of DRL over a period of time. In some cases, the length of the period of time is predetermined (e.g., 7 days). In some cases, the f3 function can be a thresholding function such that CI is set to a value depending on the range that accumulated DRL falls into (e.g., CI=moderate risk, if 8≤accumulated DRL<15). In some embodiments, these thresholds are determined by statistical analysis of the historical data.

In yet another embodiment, the condition indicator is a function of weather data, temperature or aggregated temperature (T) and/or humidity or aggregated humidity (H), and agronomic data (AD) (e.g., irrigation level, soil water content, field capacity, crop growth stage), calculated using equation (4):

$$CI=f4(T \text{ and/or } H, AD) \quad (4).$$

In some embodiments, CI is a function of the weather data and agronomic data over a period of time. In some cases, the length of the period of time is predetermined (e.g., 3 days). In some cases, one of the variables of f4 is the corresponding variable aggregated over time. In some cases, a variable of f4 can be, for example, the average temperature T over a period of time, the average daily maximum temperature T over a period of time, daily average temperature T, hourly average temperature T, the average humidity H over a period of time, the average maximum humidity H over a period of time, daily average humidity H, hourly average humidity H, and the like.

The output processor 140 is another optional component of the system 100. The output processor 140 is configured to generate outputs using the outputs generated by the multivariable processor 120 and/or predictive model processor 130. In some embodiments, the output processor 140 uses a set of predetermined fields to generate the outputs. One example of predetermined fields is listed in Table 1.

TABLE 1

| Key | Data Type | Description |
| --- | --- | --- |
| pest | String | The message key corresponding to the pest. |
| checked_status | Boolean | Indicates whether the pest was checked. |
| message | Array | A list of (key, tokens) to fill out the message. |
| geospatial_profile | Boolean | Indicate whether the field is in a region where |

TABLE 1-continued

| Key | Data Type | Description |
| --- | --- | --- |
| | | the pest has been observed. |
| geospatial_condition | Integer | Coded value used to elaborate on the geospatial profile. |
| crop_profile | Boolean | Indicate whether an impacted crop is planted in the field. |
| crop_condition | Integer | Coded value used to elaborate on the crop profile. |
| user_data_sufficient | Boolean | Indicate whether the user provided enough data, such as planting date or seed information. |
| user_data_condition | Integer | Coded value used to elaborate on the user data check, such as to describe what specifically is insufficient. |
| agronomic_profile | Boolean | Indicate whether specific agronomic factors exist, such as seed traits. |
| agronomic_condition | Integer | Coded value used to elaborate on the agronomic profile, such as whether an agronomic condition is met (e.g., observed trait resistance) |
| weather_profile | Boolean | Indicate whether appropriate weather conditions are present. |
| weather_condition | Integer | Coded value used to elaborate on the weather profile. |
| predictive_model_profile | Boolean | Indicate whether the predictive modeling indicates positive or negative result. |
| predictive_model_condition | Integer | Coded value used to elaborate on the predictive model result. |
| risk_level | Integer | A coded value representing risk levels. |
| seed_susceptibility_condition | Integer | A coded value representing the susceptibility of the seed. |

In some embodiments, the output processor 140 generates outputs using a structured object data. In one example, the output is an array of JSON ("JavaScript Object Notation") objects. In some embodiments, the output processor 140 includes a natural language processor 145 configured to generate a human-understandable text message. In some cases, the natural language processor 145 is configured to generate a message using the field data 150. In some cases, the natural language processor 145 is configured to normalize the selected portions of the field data 150 when generating a message. In some embodiments, the natural language processor 145 is configured to generate messages representing many different conditions. These conditions can represent no risk, requirements for additional data from the user, and very specific circumstances related to agronomic or pest alerts, agricultural management, and/or environmental conditions. In some cases, the natural language processor provides messages for informing users in the computer interfaces.

In some embodiments, the client application 160 is a component of the alert engine 100. In some other cases, the client application 160 is a piece of software interfacing and interacting with the alert engine 100. In some cases, the client application 160 is on a computing device. In some cases, the client application 160 is on a mobile device. In some cases, the client application 160 includes the natural language processor 145 or an interfacing module of the natural language processor 145. The client application generates user interfaces providing interactive and actionable alerts to the user, where some example graphical user interfaces are shown in FIGS. 5A-5D.

In some embodiments, the alert engine 100 includes an alert analysis processor 170. In some cases, the alert analysis processor 170 aggregates alerts across multiple fields for a grower, a crop consultant servicing multiple growers, or a regional manager. In some cases, the alert analysis processor 170 summarizes alerts regarding a specific crop across multiple fields, for example, for a crop consultant. In some other cases, the alert analysis processor 170 summarizes alerts regarding specific chemical(s) or equipment across multiple fields, for example, for a sales advisor.

In some embodiments, the system 100 generalizes the risk prediction to a wide variety of pests across a broad geographic region. In addition to risk, the system 100 generalizes alerts using the field data 150. In one embodiment, the system 100 uses digital representations of the cropping scenarios already planning or predicted to be planned to alert the grower of optimal conditions for working fields, planting seeds, performing chemical application periods, and, generally, recommending services to the grower and/or the grower's advisor through a digital interface.

In some cases, various components of the system 100 can execute software or firmware stored in non-transitory computer-readable medium to implement various processing steps. Various components and processors of the system 100 can be implemented by one or more computing devices, including but not limited to, circuits, a computer, a processor, a processing unit, a microprocessor, a mobile computing device, and/or a tablet computer. In some cases, various components of the system 100 can be implemented on a shared computing device. Alternatively, a component of the system 100 can be implemented on multiple computing devices. In some implementations, various modules and components of the system 100 can be implemented as software, hardware, firmware, or a combination thereof. In some cases, various components of the alert engine 100 can be implemented in software or firmware executed by a computing device.

Various components of the system 100 can communicate via or be coupled to via a communication interface, for example, a wired or wireless interface. The communication interface includes, but not limited to, any wired or wireless short-range and long-range communication interfaces. The short-range communication interfaces may be, for example, local area network (LAN), interfaces conforming known communications standard, such as Bluetooth® gram instructions (e .g., software instructions) that are standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 2A:
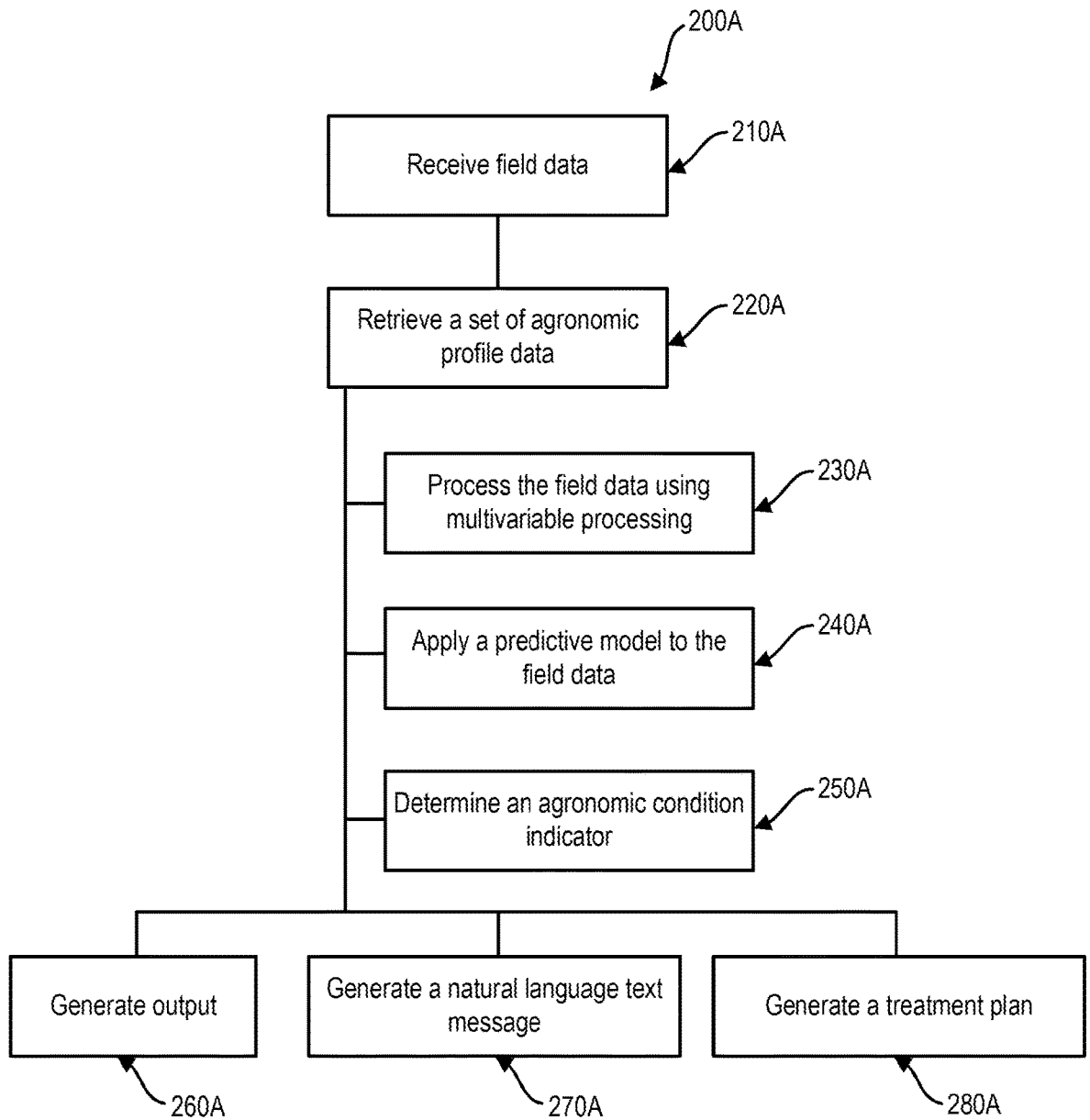
FIG. 2A illustrates one example flow diagram of the pest and agronomic alert engine.

FIG. 2A illustrates one example flow diagram of the pest and agronomic alert engine 100. One or more steps are optional to the alert engine. In this example, the alert engine receives field data (210A). In some cases, the field data includes data related to one or more fields of a grower or multiple growers. In some cases, the field data may be transmitted from a grower or grower representative operation management system. In some other cases, a part or all of the field data may be retrieved from a data repository or a data source. Optionally, the alert engine retrieves or receives a set of agronomic profile data from an agronomic data repository (220A). In some cases, the agronomic profile data includes a set of pest profile data. In some cases, the agronomic profile data includes a set of crop profile data. Next, the alert engine processes the field data using multivariable processing (230A), for example, to match the field data with the set of agronomic profile data and determine an agronomic condition indicator (250A). In some cases, a subset of the set of the pest profile data is selected in step 230A. Further, the predictive engine applies a predictive model to the field data using the subset of the pest profile data (240A) and determines an agronomic condition indicator (250A). In some cases, the condition indicator includes a pest risk level, a seed susceptibility indicator, an agronomic risk level, or any combination thereof.

The alert engine may generate output (260A). In some cases, the output has a known data structure. In some cases, the output data has a data structure similar to the data structure listed in Table 1 above. In some cases, the output is configurable. Optionally, the alert engine generates a natural language text message (270A). In some cases, the natural language text message is generated by compiling some portions of field data. In some cases, the natural language text message is generated using a dictionary having entries corresponding to the condition indicator. The alert engine may generate a treatment plan (280A). A service plan may include, for example, actions to be taken.

Figure 2B:
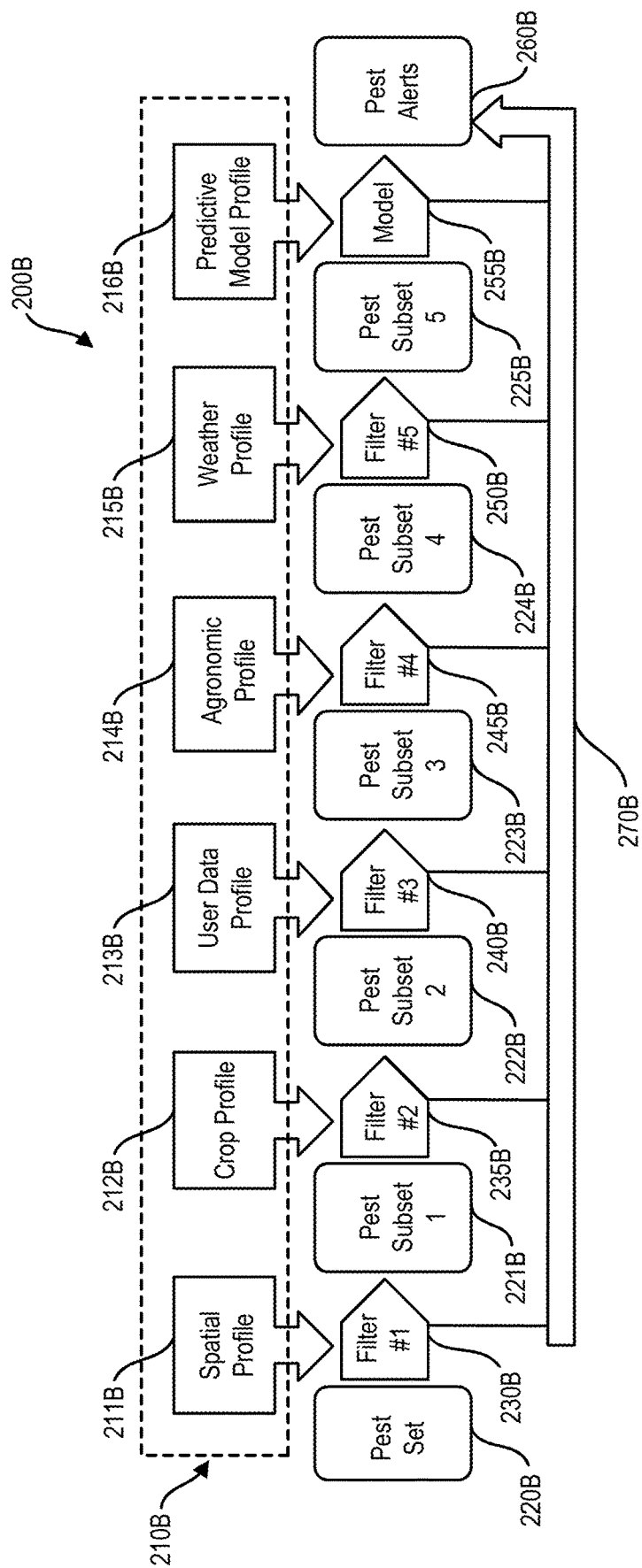
FIG. 2B shows a flow diagram of an example signature scanning method used in an alert engine.

FIG. 2B shows a flow diagram of an example signature scanning method and predictive modeling method used in an alert engine. FIG. 2B shows signature scanning method in one specific order, however, the order and the selected profile data can be changed. In the example illustrated, the alerts engine executes at a field level and loops through all supported pests. The pest scan starts with a pest set 220B and then applies a series of five profile filters (230B, 235B, 240B, 245B, 250B) using the pest profile data 210B of each pest against the field data (not illustrated). In the example illustrated, the alert engine filters the pest set 220B down to a small subset of pests 225B before any detailed biophysical or statistical models are run in set 255B using a predictive model associated with the pest record. In one example, any profile filter can be set to "None" if it is not relevant for a particular pest, which would make that profile automatically "True" if it is reached and checked. In some cases, the profile data for each pest were defined from a combination of expert rules and literature review. In one example, the engine steps through each profile in the order shown in FIG. 2B, and it immediately stops execution on the current pest, adds the current pest to pest alert 260B, and generates an alert output for the pest if one of the profile filters fails to pass. Here, a "fail" generated by a profile filter means that the pest-risk or the condition does not exist. In one example listed below, for each pest, a JSON blob is output with keys that represents whether the profile filters passed/failed or did not execute (the key is set to "None" until the profile is checked).

```
{
    'agronomic_profile': True,
    'agronomic_condition': 1,
    'alert':[
        {
            'message_key': 'products.alertengine.general.not_at_risk',
            'message_tokens': { }
        }
        {
            'message_key': 'products.alertengine.weather.no_gdd_mathc',
            'message_tokens': { }
        }
    ]
    'checked_status':True,
    'crop_profile': True,
    'crop_condition':None,
    'predictive_model_profile': None,
    'predictive_model_condition':None,
    'pest': localized:catalogs.pests.western_corn_rootworm_larvae',
    'risk level': None,
    'seek_susceptibility_condition': None,
    'spatial_profile': True,
    'spatial_condition': None,
    'user_data_profile': True,
    'user_data_condition': 1,
    'weather_profile': False,
    'weather_condition': None,
}
```

In one example, the spatial profile filter 230B checks the location of the field against pre-generated flat file or a list that contains the areas where the pest might be located. In one example, the crop profile filter 235B checks the current season crop against a pre-generated flat file or a list that contains the crops relevant for each pest. In one example, the user data profile filter 240B checks against the user's digitized operation management system to ensure that the user has entered the necessary information to support modeling of the pest in question. In one example, the agronomic profile filter 245B checks against specific agronomic conditions for that field, for example, the growth stage of the crop. In one embodiment, the weather profile filter 250B checks the relevant time period against high-level weather variables that come from both historic and forecast weather data. In some cases, the weather profile filter 250B looks for signatures that identify "wet and cold" or "hot and dry". In some other cases, the weather profile filter 250B looks for a temperature higher than a predetermined threshold for a preset period of time. In some cases, the predictive model 255B is a biophysical or statistical model that calculates the risk level for the pest. In some cases, the pest profile data does not include a predictive model profile. In some cases, a low, medium, or high risk-level is the output "risk_level" listed in the blob.

In one example, the profile filter is designed to generate output of either pass or fail when processing the input conditions with the profile requirements. In this example, the alert engine designates a fail with the integer 0 and a pass with the integer 1, as shown in FIG. 3A. All of the possible pass/fail permutations make up what we call the field's classification configuration. This is illustrated in the table of FIG. 3A by using the example from a pest known as stripe rust. For example, an alert output of (0, None, None, None, None, None, None, None) provides that the field data has failed the spatial profile filter 230B and that no other profiles are even checked. In this example, the pest (e.g., stripe rust) can only occur in certain geographies around the country, so if the field is not in one of those areas, the alert engine does not need to check additional risk requirements. In some cases, the alert engine filters stripe rust out of the possible pest risks for that field. Compare that to an alert output of (1, 1, 1, 0, None, None, None, None), which provides that the field data fails the agronomic profile filter 245B and no profile filtering after the agronomic profile is checked. In this example, stripe rust only affects the crop during specific growth stages, so if the crop is not in one of those growth stages then the pest is not relevant at that time. In some cases, the growth stage of the crop on that field is resulted from simulations from yield.

In some cases, the crop simulation needs the planting date and seed information to accurately determine the growth stage, which may come from another system, for example, a field story system. In fact, the planting and seed information is what is checked in this pest's user data profile, before the agronomic profile is checked. Therefore, an alert output of (1, 1, 0, None, None, None, None, None) provides that the user data profile filter 240B has failed, which for this pest means that the user has not entered the planting information into the system. If that is the case, the alert engine stops the pest scan because the information needed to calculate the growth stage is missing, where the growth stage is required by the agronomic profile filter 245B. In this example, in addition to determining the growth stage, the alert engine needs to know the specific hybrid variety that was planted to determine the seed susceptibility. Some hybrids have been genetically modified to resist stripe rust while others have not. The resistance may not be perfect, so while the alert engine may still provide a warning with the seed susceptibility rating (e.g., the assembled alert for the (1, 1, 1, 1, 1, 1, 3, 789)) if all other filtering conditions are met.

When a pest epidemic starts during a certain set of environmental conditions, there are certain levels of risk that might occur at different environmental thresholds. For instance, a lower temperature might equate to a lower risk, while a higher temperature might lead to a higher risk. Similarly, there are also different risk levels for different pests that are due to how susceptible the seed planted is to a particular pest. In some embodiments, seed susceptibility ratings are normalized to a 0 to 9 scale where 0 is the most susceptible and 9 is the least susceptible, as shown in the "Seed Susceptibility Condition" column of the table in FIG. 3A. If a seed does not have a susceptibility rating, the seed susceptibility rating is set to 0.

Figures 2, 3B:

FIG. 3A also illustrates some example of assembled alert messages. Each of the assembled alert messages is composed based on the filtering and modeling results. FIG. 3B illustrates another set of example output, where a condition for each profile is added. In this example, the condition is designed to capture the reason why a profile filter either passes or fails and why a predictive model generates a pass or fail output. In one embodiment, the profile or the condition is set to "−9999" if it is not relevant for this particular pest. The example given in FIG. 3B is for western corn rootworm larvae. In this example, the predictive model takes the inputs of: 1) if the seed growing in the field has the genetic trait that controls rootworm; and 2) if the field is an area of the country where resistant rootworms have been observed. The example illustrates three situations where the predictive model would give a "pass" or "1" output. In this example, even if the modeling results is a "1", the predictive model condition of "1" indicates that the seeds in the field(s) have active genetic traits that should provide effective control of the pest, such that the field is not at risk. In another situation, while the modeling results is a "1", the predictive model condition of "2" indicates that the seeds in the field(s) have active genetic traits that should provide effective control of the pest, but the area may develop pests that are resistant to generic traits, such that the field is at risk. In yet another situation, while the modeling results is a "1", the predictive model condition of "3" indicates that the seeds in the field(s) do not have active genetic traits to control the pest, such that the field is at risk.

Figure 2C:
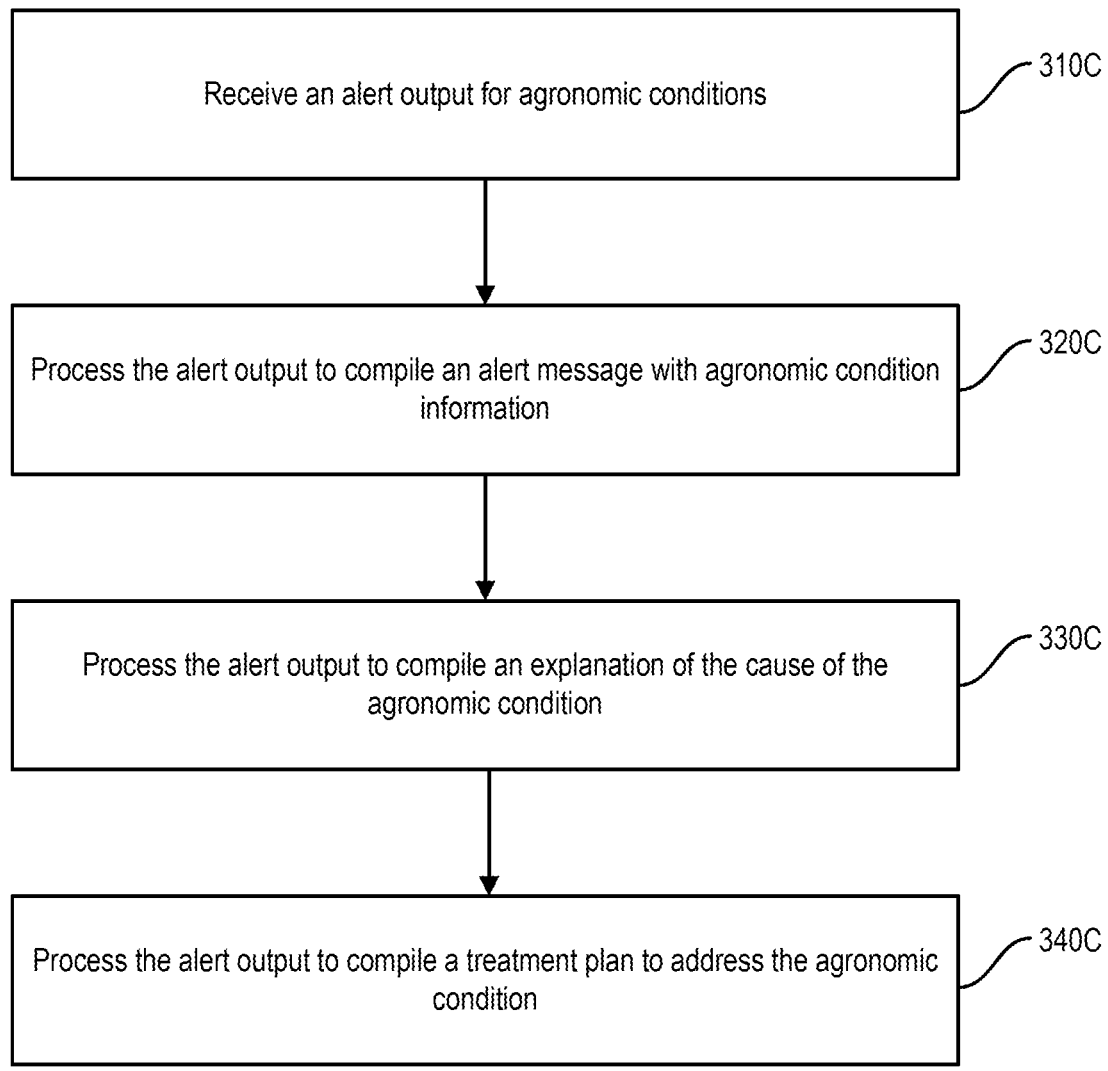
FIG. 2C illustrates an example flow diagram for the natural language processor.

After an alert output is generated, in some cases, it can be provided to a client application. In some cases, the alert output can be provided to a natural language processor (e.g., 145 of FIG. 1) to provide an interactive and actionable alert to a user. FIG. 2C illustrates an example flow diagram for the natural language processor, which can be a part of the alert engine or running independently of the alert engine. One or more steps of the flow diagram can be optional. In some cases, the natural language processor can be a web service interfacing with a client application (e.g., 160 of FIG. 1). In some other cases, the natural language processor can be a component of the client application. First, the natural language processor receives an alert output for agronomic conditions (310C). The alert output can be similar to the ones illustrated in FIGS. 3A and 3B, or different. Next, the alert output is processed to compile an alert message with agronomic condition information (320C). In some cases, the natural language processor retrieves the agronomic condition information from an agronomic data repository (e.g., 110 of FIG. 1, or other data repository or data source) based on the condition indicator in the alert output. Further, the natural language processor processes the alert output to compile an explanation of the cause of the agronomic condition (330C). In some cases, the explanation is compiled using information retrieved from the agronomic data repository based on the condition information (e.g., spatial profile condition, agronomic condition and/or other conditions in FIG. 3B). Optionally, the natural language processor processes the alert output to compile a treatment plan to address the agronomic condition (340C). In some cases, the treatment plan can be compiled using the agronomic data repository or other data sources to provide information including, for example, how to treat the condition, options of action to be taken, detailed steps of providing treatment, and other information.

The agronomic condition prediction can be complex and computationally intensive. FIGS. 4A-4D illustrate some examples of predictive models. In the example in FIG. 4A, the predictive model depends on a variable (e.g., mean daily relative humidity over 10 days). This graph represents a predictive model for fusarium graminearum, or referred to as fusarium head blight or FHB. This is a fungal disease of wheat and barley that thrives in wet and moderate conditions. Prediction of outbreak probability relies on mean relative humidity over the 10 days pre-anthesis. Anthesis here is defined as when 50% of the crop head is exposed. In one example, the predictive model is generated using equation (5):

$$FHB_{PO} = \frac{\exp(-9.203 + 0.125 * RH)}{1 + \exp(-9.203 + 0.125 * RH)}, \qquad (5)$$

where RH is the mean daily relative humidity over the 10 days prior to anthesis (%).

As illustrated, the predictive model can generate a numeric condition probability. In some cases, the alert engine will further generate a risk-level output based on the numeric risk probability. For example, the alert engine will generate a "no risk" output if the condition probability is less than 0.25, a "low risk" output if the condition probability is between 0.25 and 0.5, a "medium risk" output if the condition probability is between 0.5 and 0.75, and a "high risk" output if the condition probability is greater than 0.75.

Figure 4A:
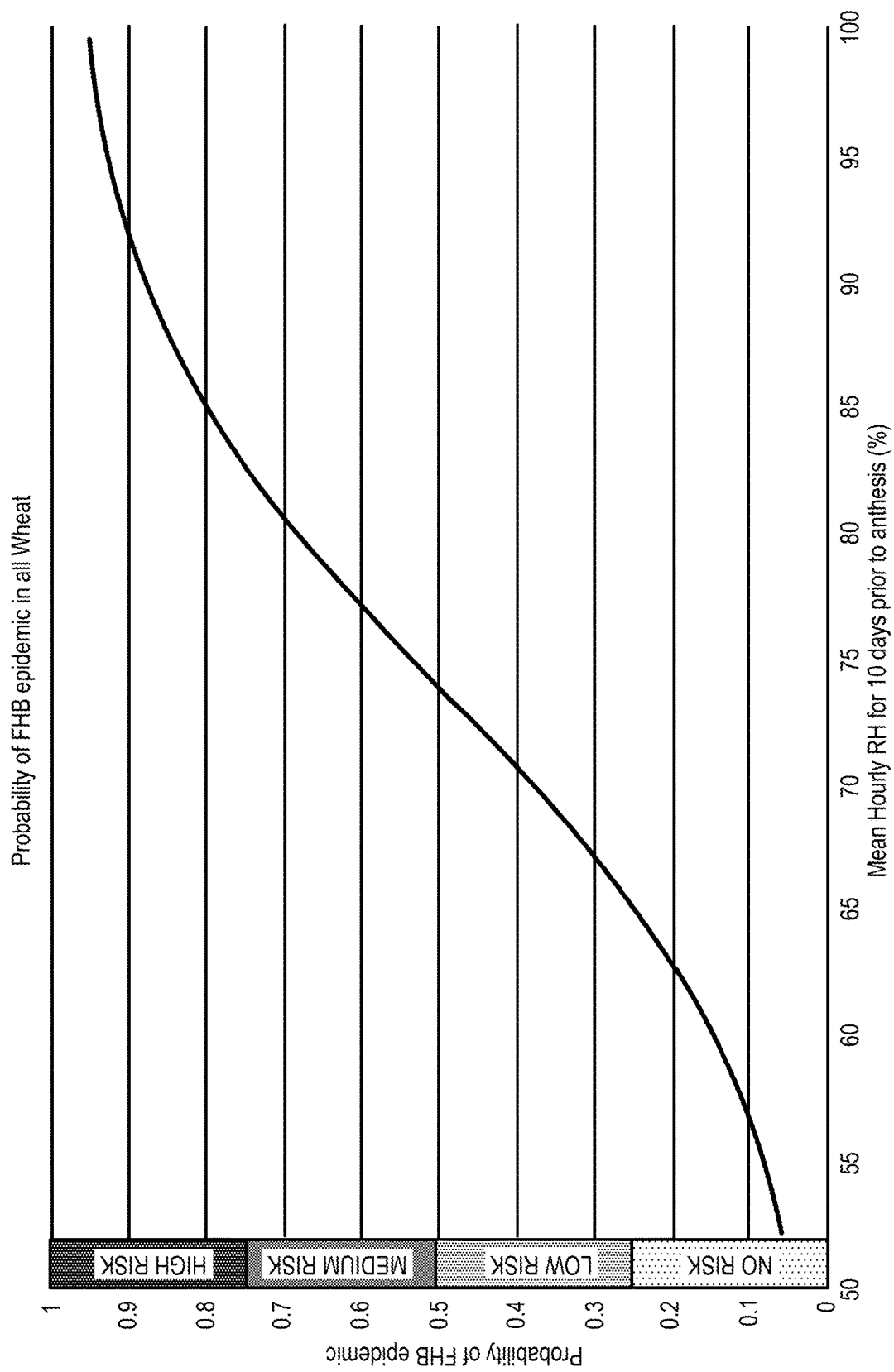
FIGS. 4A-4D illustrate some examples of predictive models.
Figure 4B:
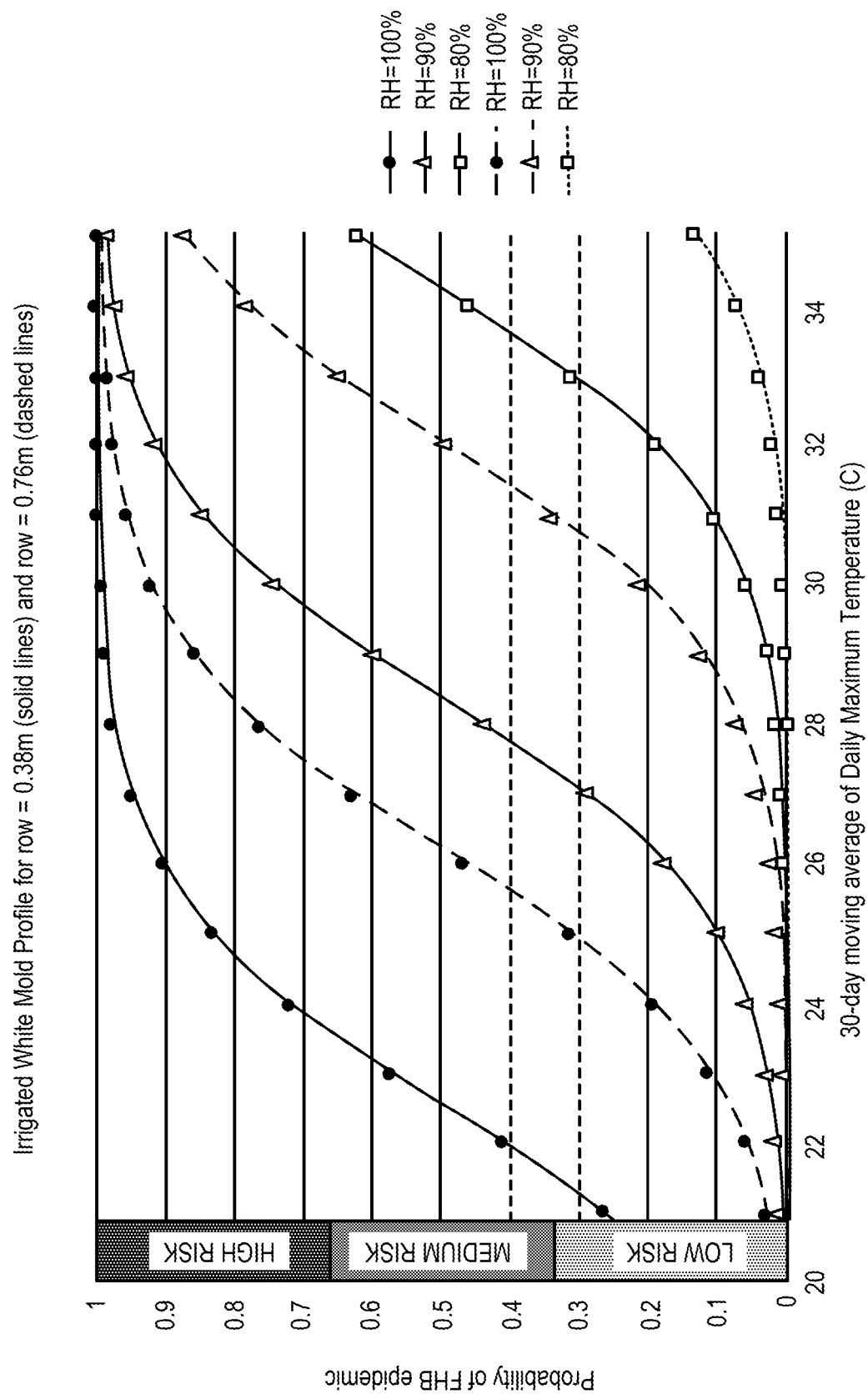

FIG. 4B shows an example predictive model based on multiple variables. This example is a model for predicting risks of sclerotinia sclerotiorum, or referred to as white mold. In this example, the x-axis is the 30-day moving average of daily maximum temperature. Another variable includes the row spacing of the crops, which is indicated by the type of line (e.g., solid or dash) in the plots. One other variable is the average of relative humidity over a period of time, which is indicated by the data point shapes (e.g., circle, triangle, square) of the plots. In this example, the six plots collectively are the predictive model. In one example, the predictive model is generated using equation (6):

$$\text{logit}(\mu) = -2.38(\text{Row}) + 0.65 * \text{Max}AT_{30MA} + 0.38 * \text{Max}RH_{30MA} - 52.65 \quad (6),$$

where Row is spacing between adjacent rows of plants, $\text{Max}AT_{30MA}$ is 30 day average of daily maximum air temperature (C), and $\text{Max}RH_{30\ MA}$ is 30 day average of daily maximum relative humidity (%). The Row is either 0 or 1, corresponding to 0.38 m or 0.76 m respectively.

In some embodiments, the predictive model can use field related data (e.g., temperature, humidity, wind speed data) collected in the past, predicted in the future, and a combination thereof. For example, the 30-day moving average is an average of data collected in the last 30 days. As another example, the 30-day moving average is an average of data predicted in the next 30 days. As yet another example, the 30-day moving average is an average of data collected in the last 20 days and data predicted in the next 10 days. The predictive model in FIG. 4B can generate a numeric condition probability. In some cases, the alert engine will further generate a risk-level output based on the numeric risk probability. For example, the alert engine will generate a "low risk" output if the condition probability is less than 0.33, a "moderate risk" output if the condition probability is between 0.33 and 0.67, and a "high risk" output if the condition probability is greater than 0.67.

Figure 4C:
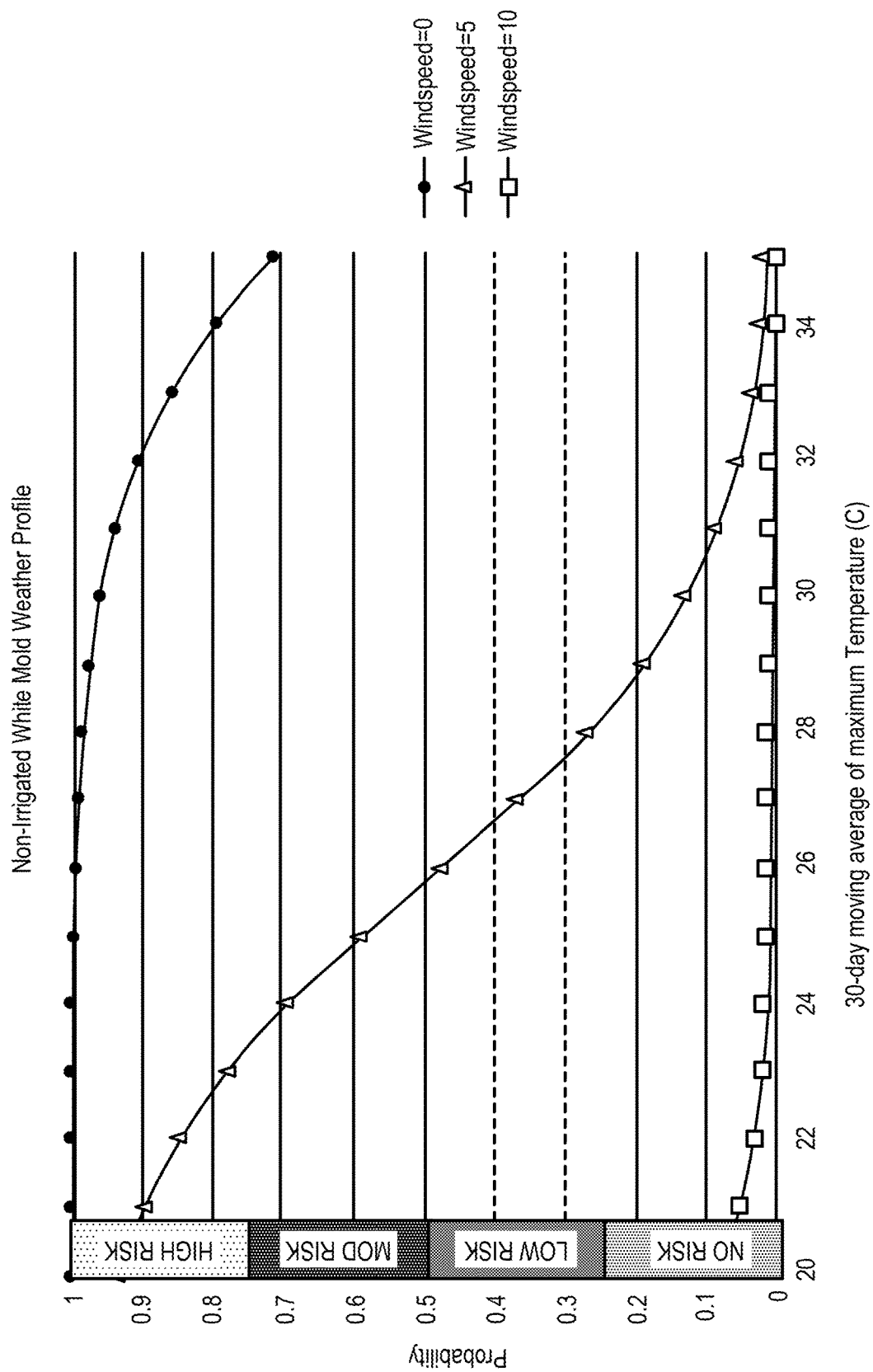

In one embodiment, the predictive model in FIG. 4B is a predictive model for irrigated fields, while FIG. 4C illustrates a predictive model for non-irrigated fields. In one example, the predictive model in FIG. 4C is generated using equation (7):

$$\text{logit}(\mu) = -0.47 * \text{Max}AT_{30MA} - 1.01 * \text{Max}WS_{30MA} + 16.65 \quad (7),$$

where $\text{Max}AT_{30MA}$ is 30 day average of daily maximum air temperature (C), and $\text{Max}WS_{30MA}$ is 30 day average of maximum wind speed (m/s).

The predictive model in FIG. 4C can generate a numeric condition probability. In some cases, the alert engine will further generate a risk-level output based on the numeric risk probability. For example, the alert engine will generate a "no risk" output if the condition probability is less than 0.25, a "low risk" output if the condition probability is between 0.25 and 0.5, a "medium risk" output if the condition probability is between 0.5 and 0.75, and a "high risk" output if the condition probability is greater than 0.75. The risk-level outputs in FIG. 4C have different ranges of numeric risk probability from the risk level outputs in FIG. 4B.

Figure 4D:
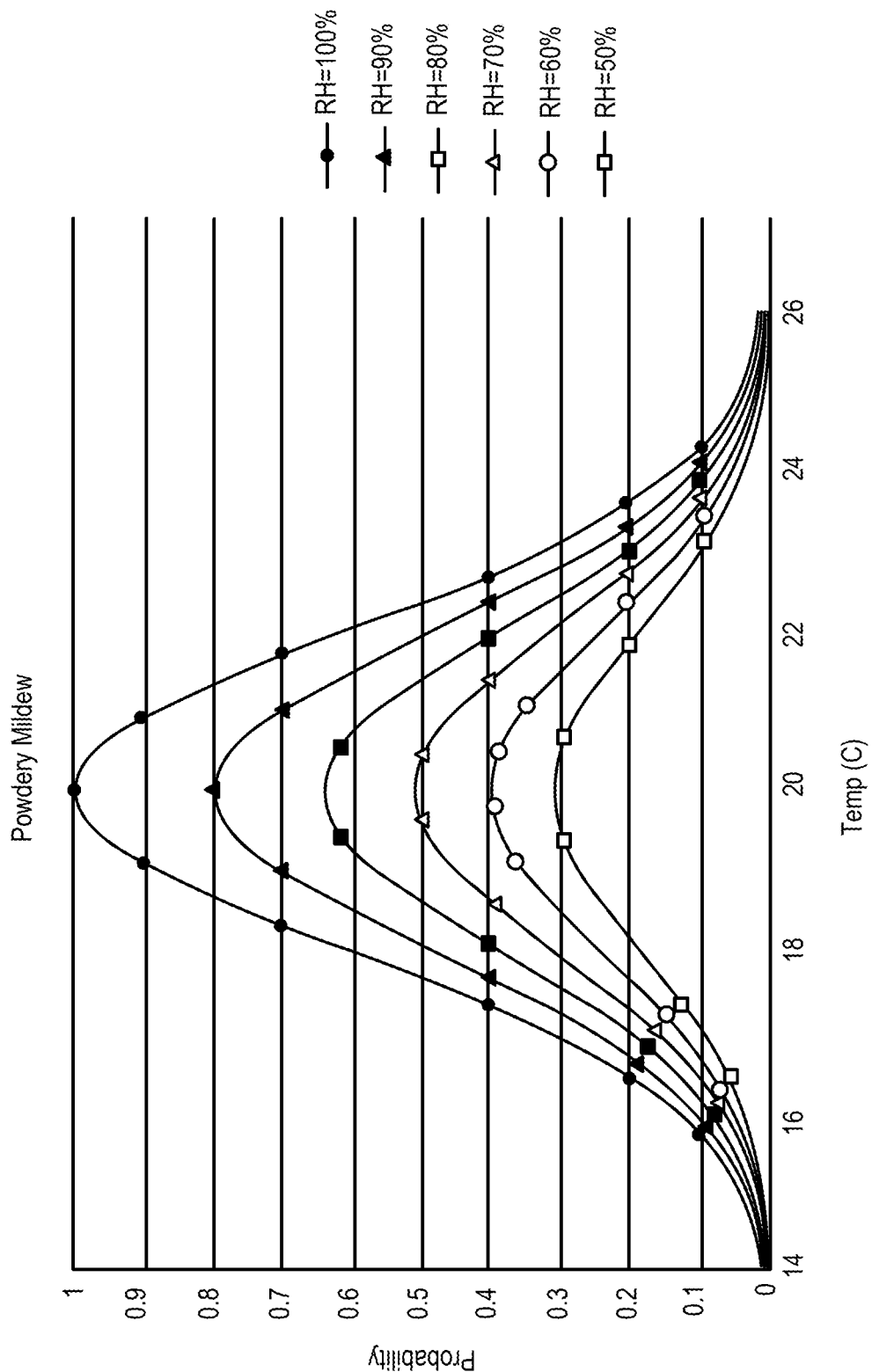

FIG. 4D illustrates one other example of a predictive model. This example is for predicting risks for blumaria gramminis, also referred to as powdery mildew. This model uses a probability distribution function, using a daily average temperature and daily average relative humidity as variables. In one example, the predictive model can be generated using equation (8) and (9):

$$PDF(\mu, \sigma^2) = \frac{1}{\sqrt{2\pi\sigma^2}} e^{-\frac{(T-\mu)^2}{2\sigma^2}}, \quad (8)$$

$$PM_{RISK} = \sum_{day=1}^{7} \left( \frac{RH}{-0.25\,RH + 45} * PDF(20, 4) \right), \quad (9)$$

where T is the daily average temperature (C), RH is the daily average humidity (%), $\mu$ is the mean, $\sigma^2$ is the standard deviation, PDF is the probability distribution function, and $PM_{RISK}$ is the risk of powdery mildew. As illustrated in the figure, the risk is significantly higher in certain temperature ranges.

The predictive model in FIG. 4D can generate a numeric condition probability. In some cases, the alert engine will further generate a risk-level output based on the numeric risk probability. For example, the alert engine will generate a "no risk" output if the risk probability is less than 0.35, a "low risk" output if the risk probability is between 0.35 and 0.45, a "medium risk" output if the risk probability is between 0.45 and 0.5, and a "high risk" output if the risk probability is greater than 0.5.

Figure 5A:
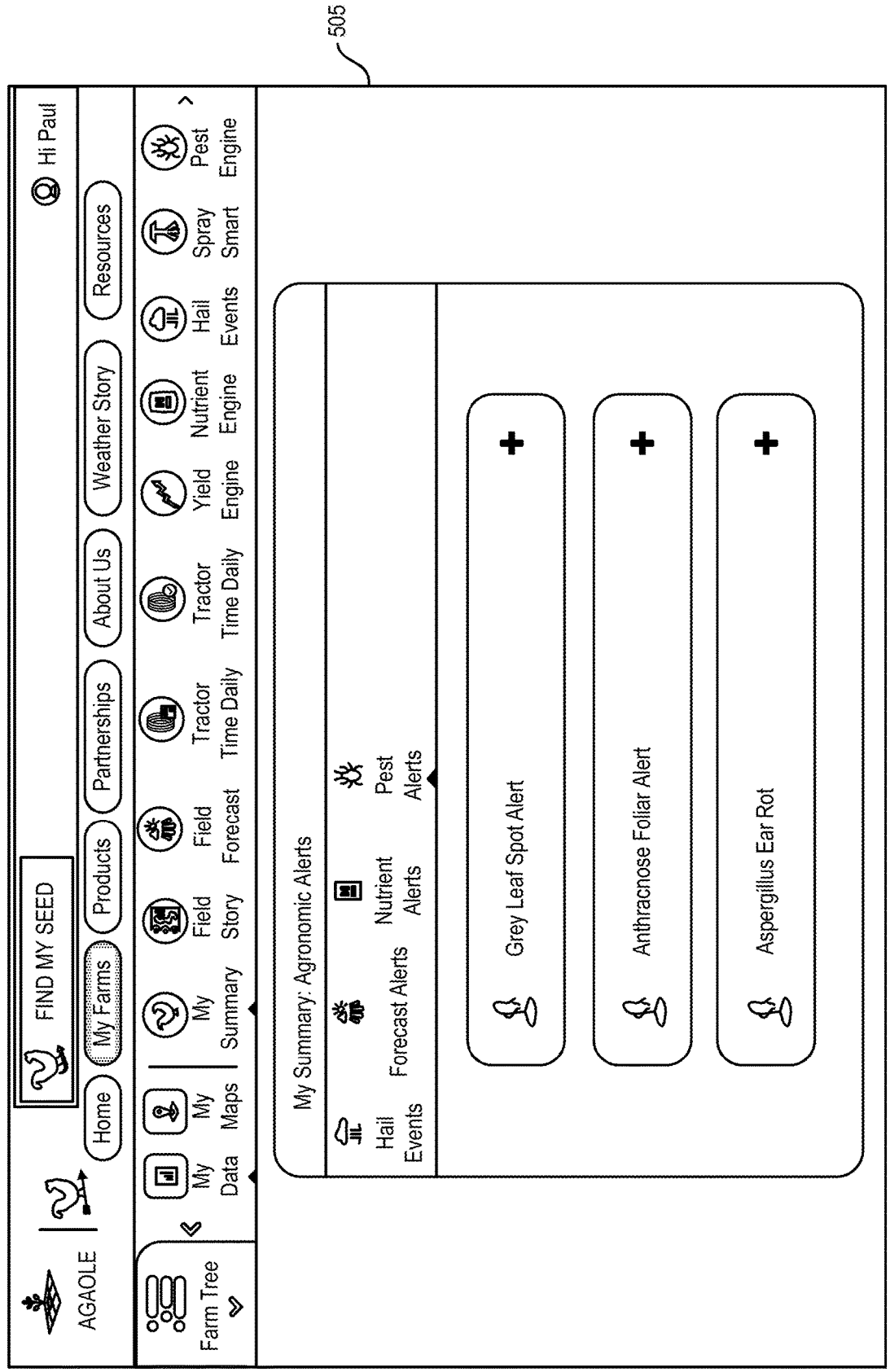
Figure 5B:
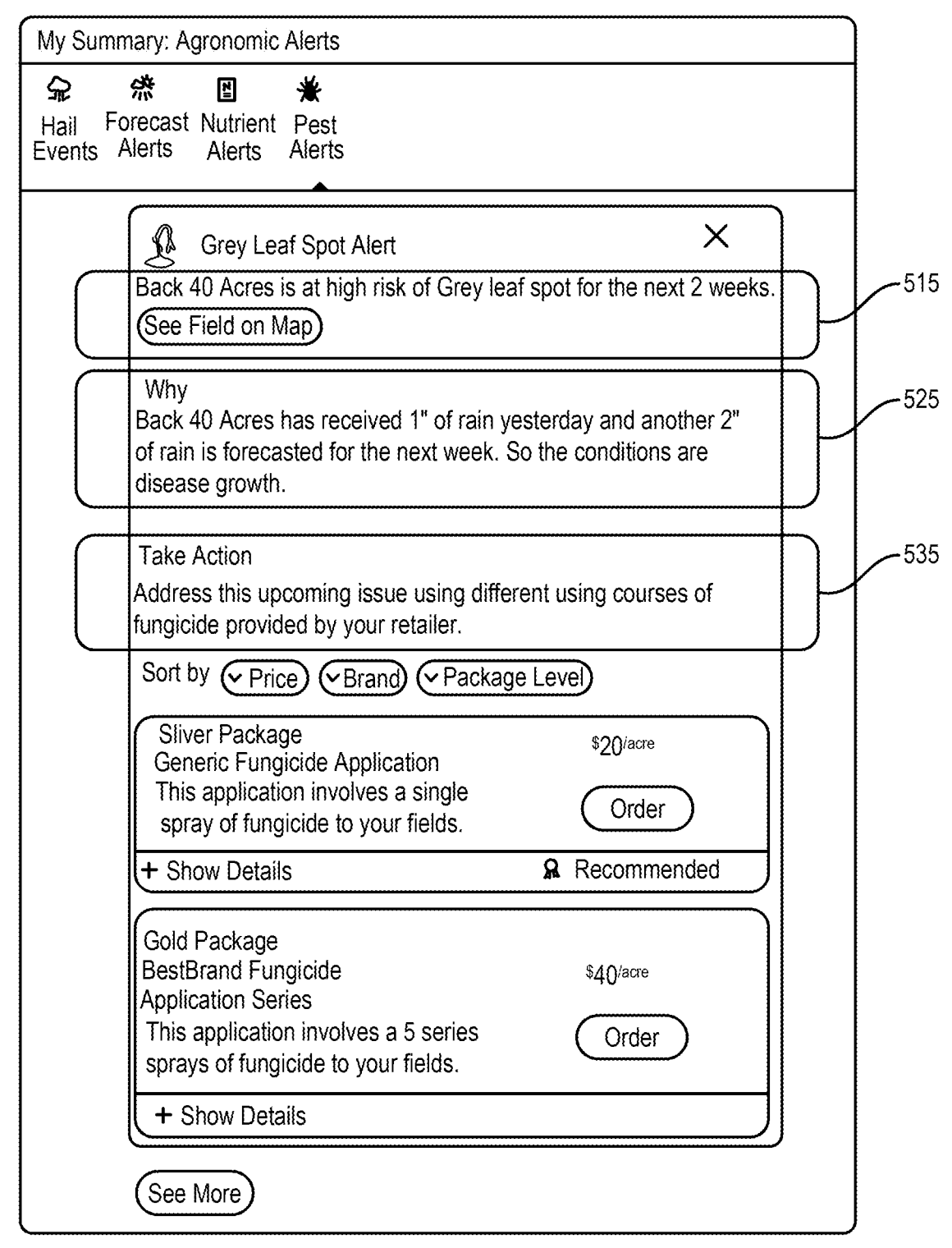

The alert engine can have several use scenarios. FIGS. 5A-5D are screen captures of some example user interfaces of a client application (e.g., 160 of FIG. 1) that is supported by the alert engine. In one case, the alert engine can forecast risk ahead a few days to a few weeks the pest and agronomic pressures. In this case, the client application will display the alerts, as illustrated in FIG. 5A. In some cases, the alerts are updated periodically. In some cases, the alerts are updated continually. In some cases, alerts are created for specific crops, management scenarios, seed traits, and agronomic conditions. In some embodiments, the alerts are messages indicating forecasted favorable or unfavorable conditions for agronomic decision making, for example, conditions favoring plantability, seed germination, tillage operations, crop harvest condition, and/or other agronomic conditions.

In some cases, the client application provides real time interactions with the user. For example, the actionable control 505A can activate FIG. 5B, which illustrates more explainable context for evaluation of both risk and lack of risk via a natural language processor (e.g., 145 of FIG. 1). The natural language processor assesses the alert information (e.g., alert output as illustrated in FIGS. 3A and 3B) and provides a "what?" message displayed in 515. Next, the natural language processor processes the alerts and compiles a "why?" message in 525. Further, the natural language processor processes the alert and compile an actionable part of answering "how" to address the condition, displayed at 525.

Figure 5C:
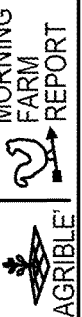
Figure 5D:
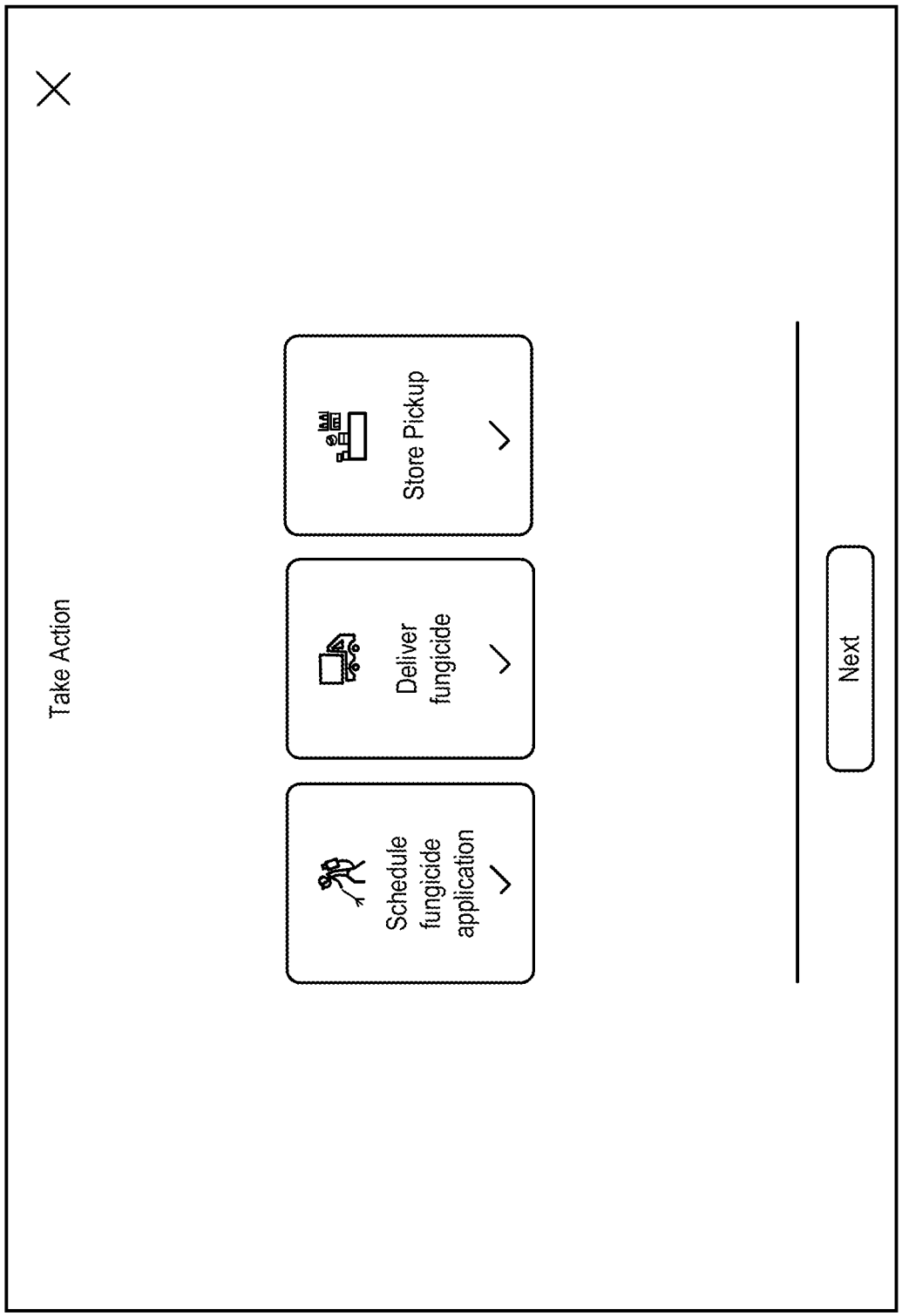

In some cases, the client application can provide aggregate information to the user. FIG. 5C illustrates one example user interface showing aggregated alerts and allowing the user to take actions. In this example, twenty-one fields of a grower are showing at risk of grey leaf spot. The client application allows the user to select the field(s) to be treated with a fungicide application. Based on the selections, actions can be taken and scheduled, as illustrated in FIG. 5D.

The methods thus described may be implemented on one or more computing systems having processors and memories. Non-transient computer readable media may also include instructions that cause such systems to carry out methods described above.

Various modifications and alterations of this invention will be apparent to those skilled in the art without departing from the spirit and scope of this invention. The inventions described herein are not limited to the illustrative examples set forth herein. For example, the reader should assume that features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method implemented on a computer system having one or more processors and memories, comprising:
    receiving a set of field data for a location, the set of field data comprising geospatial data, crop data, agronomic data, and weather data;
    retrieving a plurality of sets of agronomic profile data from an agronomic data repository stored in the one or more memories, each of the sets of agronomic profile data representing an agronomic condition and comprising a geospatial profile, crop profile, agronomic profile, and weather profile corresponding to the agronomic condition;
    applying, by the one or more processors, multivariable processing to the set of field data, using one or more of the geospatial profile, crop profile, agronomic profile and weather profile of each of the plurality of sets of agronomic profile data, including, before processing using the agronomic profile of the set of agronomic profile data, determining whether the field data is missing information required for processing using the agronomic profile;
    discontinuing the multivariable processing using the set of agronomic profile data when it is determined that the field data is missing information required for processing using the agronomic profile;
    discontinuing the multivariable processing using the set of agronomic profile data when it is determined that one of the geospatial profile, crop profile, agronomic profile or weather profile of the set of agronomic profile data does not match the field data;
    generating, based on the multivariable processing, an agronomic condition indicator indicative of one or more agronomic conditions applicable to the location; and
    determining a treatment plan based on the agronomic condition indicator;
    generating an alert output based on the agronomic condition indicator and the determination that the field data is missing information if the field data is missing information required for processing using the agronomic profile;
    wherein the alert output includes a text message generated using a natural language processor;
    wherein the natural language processor is configured to:
        retrieve information related to the one or more agronomic conditions from the agronomic data repository;
        retrieve information related to the missing field data if the field data is missing information required for processing using the agronomic profile;
        normalize one or more selected portions of the set of field data;
        generate an explanation of one or more causes of the one or more agronomic conditions based on the retrieved information;
        generate an explanation of the missing field data based on the retrieved information relating to the missing field data if the field data is missing information required for processing using the agronomic profile;
        compile the text message using the explanation of the one or more causes of the one or more agronomic conditions and the one or more normalized selected portions of the set of field data; and
        compile the text message using the explanation of the missing field data if the field data is missing information required for processing using the agronomic profile; and
    causing the alert output, including the text message, to be output on a display to the user.

2. The method of claim 1, wherein applying multivariable processing further comprises selecting a subset of the set of the agronomic profile data.

3. The method of claim 2, further comprising:
    applying, by the one or more processors, a predictive model to the set of field data using the subset of the set of the agronomic profile data to generate the agronomic condition indicator.

4. The method of claim 3, wherein the predictive model comprises a temporal model that has a variable aggregated over time.

5. The method of claim 3, wherein the predictive model is a predictive model for a specific agronomic condition.

6. The method of claim 5, wherein the predictive model is a part of an agronomic profile data corresponding to the specific agronomic condition.

7. The method of claim 1, wherein the alert output includes information on a positive agronomic condition and explanation of a cause of the positive agronomic condition.

8. The method of claim 1, further comprising:
    receiving an input from the user; and
    performing an action according to the input.

9. The method of claim 1, wherein the location is a field.

10. The method of claim 1, wherein the location is a plurality of fields.

11. The method of claim 10, further comprising:
    analyzing the agronomic condition indicator across the plurality of fields.

12. A method implemented on a computer system having one or more processors and memories, comprising:
    receiving a set of field data for a location, the set of field data comprising geospatial data, crop data, agronomic data, and weather data;
    retrieving a plurality of sets of pest profile data for a plurality of pest conditions from an agronomic data repository stored in the one or more memories, each of the sets of pest profile data representing data for the pest condition and comprising geospatial profile, crop profile, agronomic profile, and weather profile related to the pest condition;
    applying, by the one or more processors, multivariable processing to the set of field data, using one or more of the geospatial profile, crop profile, agronomic profile and weather profile of the plurality of sets of pest profile data, including, before processing using the agronomic profile of the set of pest profile data, determining whether the field data is missing information required for processing using the agronomic profile;

discontinuing the multivariable processing using the set of pest profile data when it is determined that the field data is missing information required for processing using the agronomic profile;

discontinuing the multivariable processing using the set of pest profile data when it is determined that one of the geospatial profile, crop profile, agronomic profile or weather profile of the set of pest profile data does not match the field data;

generating, based on the multivariable processing, a pest risk indicator indicative of a pest condition applicable to the location, determining a treatment plan based on the pest risk indicator;

generating an alert output based on the pest risk indicator and the determination that the field data is missing information if the field data is missing information required for processing using the agronomic profile;

wherein the alert output includes a text message generated using a natural language processor;

wherein the natural language processor is configured to:

retrieve information related to one or more of the pest conditions from the agronomic data repository;

retrieve information related to the missing field data if the field data is missing information required for processing using the agronomic profile;

normalize one or more selected portions of the set of field data;

generate an explanation of one or more causes of the one or more pest conditions based on the retrieved information;

generate an explanation of the missing field data based on the retrieved information relating to the missing field data if the field data is missing information required for processing using the agronomic profile;

compile the text message using the explanation of the one or more causes of the one or more pest conditions and the one or more normalized selected portions of the set of field data; and compile the text message using the explanation of the missing field data if the field data is missing information required for processing using the agronomic profile; and causing the alert output, including the text message, to be output on a display to the user.

13. The method of claim 12 further comprising:
applying, by the one or more processors, a predictive model to the set of field data to generate the pest risk indicator.

14. The method of claim 13, wherein the predictive model comprises a temporal model that has a variable aggregated over time.

15. The method of claim 13, wherein the predictive model is a predictive model for a specific pest condition.

16. The method of claim 12, further comprising:
determining a treatment plan based on the pest risk indicator.

17. The method of claim 12, further comprising:
receiving an input from the user; and
performing an action according to the input.

18. The method of claim 12, wherein the location is a field.

19. The method of claim 12, wherein the location is a plurality of fields.

20. The method of claim 19, further comprising:
analyzing the pest risk indicator across the plurality of fields to generate a treatment plan.

21. The method of claim 12, wherein the set of field data comprising collected field related data and predicted field related data.

22. The method of claim 1, wherein:
receiving the set of field data further comprises receiving user data;
retrieving a set of agronomic profile data further comprises retrieving a user data profile; and
applying multivariable processing further comprises using the user data profile.

23. The method of claim 12, wherein:
receiving the set of field data further comprises receiving user data;
retrieving the set of pest profile data further comprises retrieving a user data profile; and
applying multivariable processing further comprises using the user data profile.

* * * * *